United States Patent [19]

Voorhees

[11] Patent Number: 5,016,147

[45] Date of Patent: May 14, 1991

[54] FLIGHT DESK WITH INDICATORS

[76] Inventor: Scott W. Voorhees, 1515 Davis Ford Rd., Suite 6, Woodbridge, Va. 22192

[21] Appl. No.: 285,017

[22] Filed: Dec. 16, 1988

[51] Int. Cl.$^5$ .............................................. F21V 33/00
[52] U.S. Cl. ..................................... 362/99; 362/234; 362/251; 362/800; 108/43; 108/50; 40/489; 24/67 R
[58] Field of Search ....................... 362/85, 97, 98, 99, 362/109, 234, 240, 251, 800; 340/815.03, 815.06, 815.13; 108/43, 50; 116/319; 40/489, 490; 281/45; 24/67 R

[56] References Cited

U.S. PATENT DOCUMENTS

| | | | |
|---|---|---|---|
| D. 284,674 | 7/1986 | Vignerot et al. | D18/14 |
| D. 284,976 | 8/1986 | Hung | D18/2 |
| 3,232,685 | 2/1966 | Wilstein et al. | 362/99 X |
| 3,875,396 | 4/1975 | Webb | 362/99 |
| 3,962,808 | 6/1976 | Ryder et al. | 40/490 X |
| 4,153,927 | 5/1979 | Owens | 362/99 |
| 4,375,881 | 3/1983 | Mitchell | 248/441 B |
| 4,468,841 | 9/1984 | Herington | 24/67 R |
| 4,610,054 | 9/1986 | Malian | 24/67 R |

OTHER PUBLICATIONS

"Heads Up Checklist" brochure, admitted prior art, 4/1/88.
Mar., 1986 article of Lacagnina, "Safety Corner", p. 106.
Aug., 1988 "Flying" magazine, p. 86.
Composite of AOPA Pilot magazine ads, 1976, 1977, 1979.
AOPA Pilot magazine, Jan., 1988 edition, pp. 73 and 74.
P. 36, "Pilot Supplies" catalog page, admitted prior art, no publication date.
Sporty's Pilot Shop catalog Nov., 1985, pp. 49 through 53.
Sporty's Jul. through Oct. 1988 catalog, catalog heading and pp. 50 through 56.
Aircraft Components, Inc. catalog pp. 18 through 21, admitted prior art, no publication date.
Miscellaneous catalog pp. 64 and 65, admitted prior art, no publication date.

Primary Examiner—Stephen F. Husar
Attorney, Agent, or Firm—Nixon & Vanderhye

[57] ABSTRACT

A flight desk is simple yet provides visual indicators so that a more failsafe procedure may be followed utilizing the device for pilot pre-flight checklists, or other lists or procedures. A board assembly includes a main body having a flat top surface, and a number of visual indicators, such as LEDs. The LEDs are mounted on the main body top surface so that when an indicator card with pre-flight or in-flight indicia is mounted on the flat surface, the indicia line up with the LEDs. A clip, or like holding device, holds the indicator card on the flat top surface. A storage compartment is formed in the body for receipt of a number of the indicator cards, with tabs of the cards extending outwardly from the body. Channels are defined along the top and bottom edges of the body for receipt of electrical accessories with protrusions shaped like the channels, or mechanical accessories with similarly shaped protrusions. An electrical switch may be associated with each LED, or two LEDs can be associated with each switch, or a common switch may be provided for all the light emitting diodes, with an additional advancing switch.

18 Claims, 5 Drawing Sheets

FLIGHT DESK WITH INDICATORS

BACKGROUND AND SUMMARY OF THE INVENTION

Pilots—whether they fly airplanes in the performance of military duties, as a business, or for recreation—utilize check lists as part of a pre-flight or in-flight (or the like) procedure. The utilization of written check lists is an important safety procedure for flying aircraft of all types (e.g. planes, helicopters, autogyros, etc.).

Over the years there have been many different systems developed for facilitating proper review of check lists, including relatively low tech items called variously pilot's clip boards, flight desks, and knee boards. Some of these devices include mechanisms for clipping variable check list sheets in place, a lamp to allow viewing at night, and/or surface manifestations for facilitating holding of a writing implement or the like. While these devices are helpful they are not normally as versatile as desired, and are not failsafe.

Other, sophisticated devices have also been developed, such as check list computer units sold under the trademark "HEADS UP". While such computerized check lists do provide failsafe features, they are very expensive, more expensive than the average general aviation pilot would utilize, and also more expensive than many commercial organizations could justify on an economic basis.

According to the present invention, a flight desk is provided which has failsafe features of operation, yet is small, portable, and relatively inexpensive. Thus the device according to the present invention combines the best features of the prior art knee boards or the like, and sophisticated failsafe computers. The device may be utilized by all sorts of pilots, including general aviation, military, and commercial pilots.

According to one aspect of the present invention, a board assembly is provided having a main body with a substantially flat top surface, and a plurality of visual indicator means—such as light emitting diodes. Means are provided for mounting the visual indicator means in operative association with the main body top surface so that when an indicator card is placed on the top surface, areas of the indicator card line up with the visual indicator means. A mechanism is also provided for holding an indicator card on the top surface in alignment with the visual indicator means, such as a conventional clamp of a clipboard, spring clamps associated with the indicator means, or any of a wide variety of other devices.

A plurality of indicator cards are provided. Each card is dimensioned to fit on the top surface and has indicia thereon positioned in operative association with at least a few of the visual indicator means. A storage compartment is provided in the body of the board assembly, for receipt of the indicator cards. The storage compartment is dimensioned so that it can fit a plurality of the cards, with tabs on the cards extending outwardly from the storage compartment for easy access. By a simple movement of slide blocking devices, or by spring detents which engage notches in the cords, the cards may be selectively removed from the storage compartment, or held within the compartment.

The board is also designed so that it readily mounts electrical, or mechanical, accessories. For example it is desired to provide means defining channels along the top and bottom edges of the board. Protrusions on electrical and mechanical components—such as on a calculator, a clamp, a pencil holder, or the like—are shaped and dimensioned to cooperate with the channels.

A switch may be associated with each visual indicator, or there may be a single switch for selection of on, off, and other modes (e.g. pre-set and programs), with other switches for setting or advancing movement of the lights. Circuitry may then be provided for automatically advancing the indicator light sequence as elements are checked off. A wide variety of other alternatives are also available, such as providing two rows of visual indicators, with different colors, one indicating the element must still be checked off, and the other indicating it has been checked off.

It is the primary object of the present invention to provide a failsafe, yet effective, aid for pilots going through pre-flight and in-flight safety checklists procedures. This and other objects of the invention will become clear from an inspection of the detailed description of the invention, and from the appended claims.

DETAILED DESCRIPTION OF THE DRAWINGS

Figure 1:
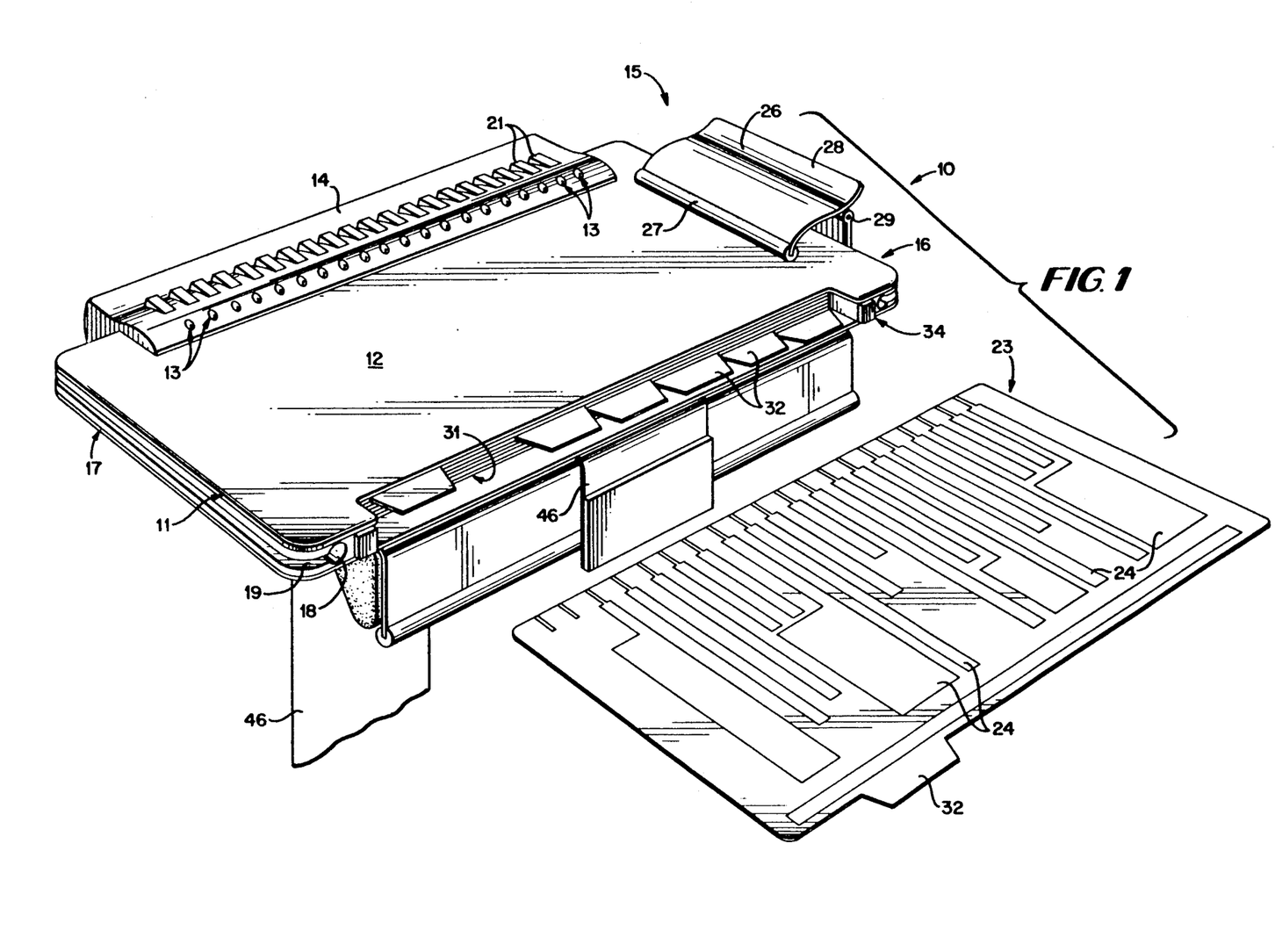
FIG. 1 is a perspective exploded view of a first embodiment of an exemplary board assembly according to the present invention.

A board assembly according to the present invention is shown in exemplary form, generally, by reference numeral 10 in FIG. 1. The major components of the board assembly 10 include the main body 11, having a substantially flat top surface 12, a plurality of visual indicator means shown generally by reference numeral 13, means—shown generally by reference numeral 14—for mounting the visual indicator means in operative association with the main body 11, and holding means, such as the clamp assembly 15.

The main body 10 may be composed of any desirable material such as aluminum, plastic, fiberboard, composite materials, or the like. Preferably there are provided means defining channels therein. The channels—which are preferably defined at the top end 16 and at the bottom end 17 thereof—include a main portion 18, and an outer portion 19 providing communication between the main portion 18 and the environment. The portion 18 is shaped and dimensioned so as to receive a like shaped and dimensioned element for mounting an electrical or mechanical component to the main body 11.

The visual indicator means 13 preferably comprise a plurality of light emitting diodes, although light bulbs, reflectors, or other visual indicators, may also be provided. In the embodiment illustrated in FIG. 1, the light emitting diodes 13 are mounted by a housing 14 along one side edge of the body 11. The housing 14 also preferably mounts one or more batteries for powering the light emitting diodes 13, and any appropriate or necessary circuitry.

As illustrated in FIG. 1, a switch 21 is associated with each LED 13 for energizing, or de-energizing, it. When an indicator card, such as a card 23—is placed in operative association with the main body top surface 12, information containing areas 24 on the indicator card 23 line up with many (if not all) of the LEDs 13. A conventional clamp 15 holds the card 23 in place once it has been properly aligned by the pilot. The clamp 15 includes a movable element 26 having a card engaging portion 27 and a hand engaging portion 28, and is mounted for pivotal movement about an axis 29. A spring (not shown) biases the portion 27 into engagement with the card 23.

The assembly 10 also preferably includes means defining a storage compartment, shown generally by reference numeral 31, accessible from the opposite side on the surface 12 from the LEDs 13. A plurality of cards 23 can be stored in the storage compartment 31, with tabs 32 associated with the cards sticking outwardly. The tabs 32 preferably have indicia thereon indicating which pre-flight or in-flight procedure(s) is provided thereon.

Figure 5:
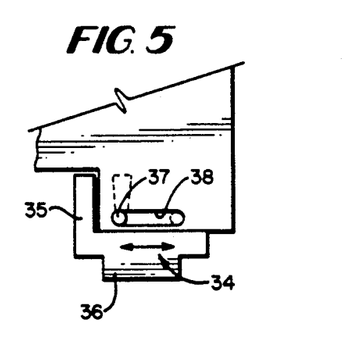
FIG. 5 is a top detail view of a blocking element associated with the card storage components of the assembly of FIG. 1.

Preferably the cards 23 are held within the storage compartment by locking means, such as the elements 34 visible in FIGS. 1 and 5. The elements 34 include an arm portion 35 which is adapted to engage the cards 23 and prevent them from falling out the storage compartment 31. Also a knob portion 36 is provided. The element 34 is mounted for reciprocation in the directions of the arrows indicated in FIG. 5, an outwardly extending pin 37 thereof being received within an elongated slot 38 in the body 11 for guiding the element 34 in its reciprocal movement. By moving both elements 34 toward each other, the cards 23 are engaged and blocked, and will not fall out of the compartment 31. By moving both elements 34 away from each other, a card 23 can be grasped by the tab 32 thereof and removed. Alternatively, the locking means may comprise spring biased detents and the top and bottom of the compartment 31 which engage notches in the cards 23 to releasably hold them in place.

Figure 2:
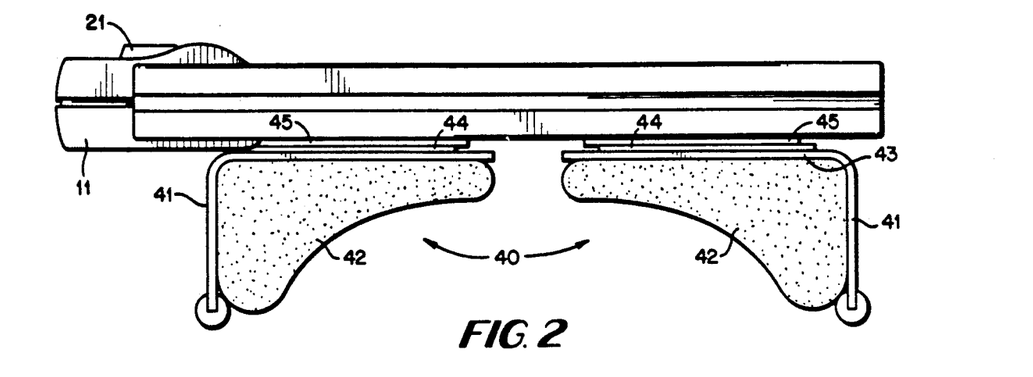
FIG. 2 is an end view of the board assembly of FIG. 1, with mechanical and electrical channel insertion components removed therefrom, and showing the mechanism for mounting the board assembly on a pilot's leg.
Figure 3:
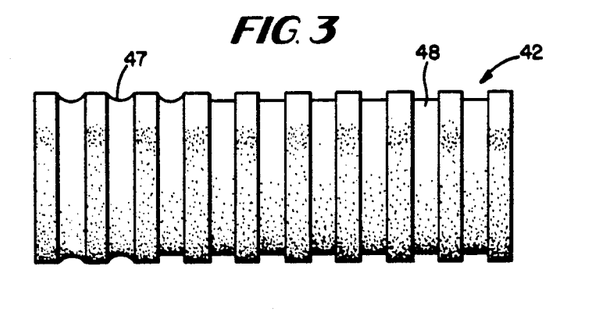
FIG. 3 is a front view of one of the mounting elements of FIG. 2.
Figure 4:
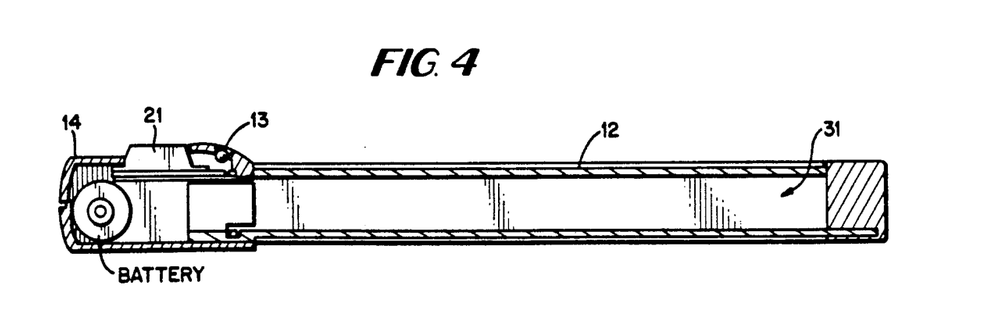
FIG. 4 is a cross-sectional view of the device illustrated in FIG. 3, with the leg supporting elements removed.

The main body 11 is mounted on the pilot's knee utilizing the mounting components, such as illustrated generally by reference numeral 40 in FIG. 2. The elements 40 comprise right angled portions of rigid material, such as aluminum, illustrated generally by reference numerals 41, with foam pads 42 received therein. On the long legs 43 of the elements 41 preferably are provided Velcro sheets ("Velcro" is a trademark for hook and pile fasteners), illustrated by reference numerals 44, which cooperate with oppositely constructed Velcro sheets 45 on the bottom of the body 11. Preferably the foam pads 42 are grooved along the length thereof, as illustrated in FIG. 3. FIG. 3, for purposes of the breadth of illustration, illustrates two different grooving patterns that may be utilized, a rounded grooving pattern 47 illustrated on the left-hand side thereof, and a more square grooving pattern 48 illustrated on the right side thereof.

The strap components 46 also are provided, which are wrapped around the pilot's leg and utilized to hold the board assembly 10 in a sturdy position on the pilot's leg. Velcro, clamp, or like fasteners may be provided associated with the strap components 46 for holding them in place.

Figure 6:
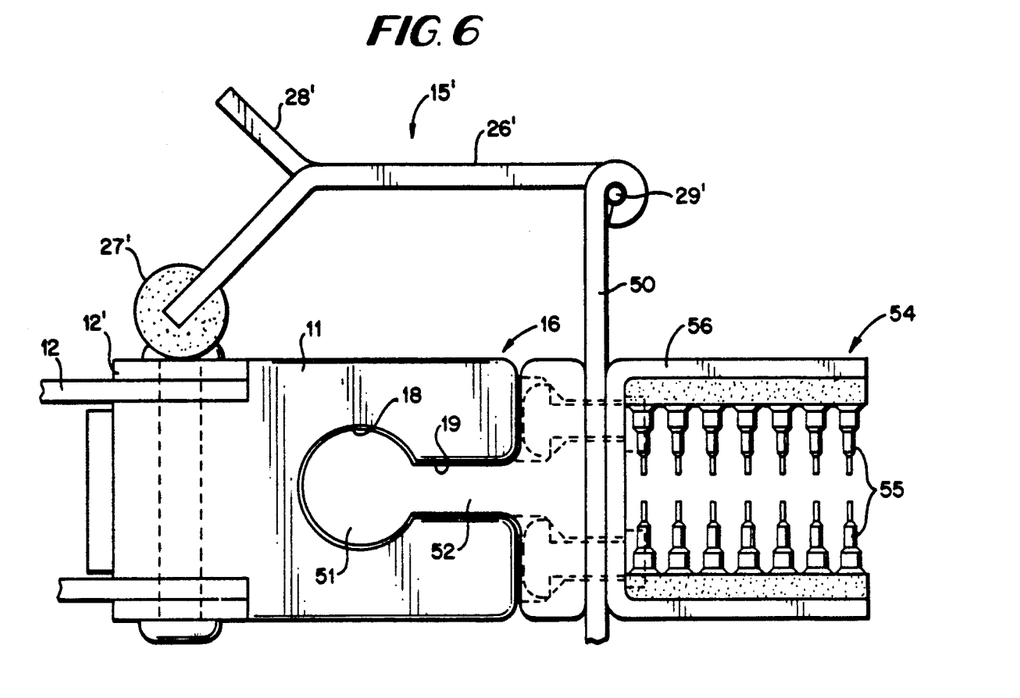
FIG. 6 is an end detail view of an exemplary mechanical clip and writing implement holding device for use with the assembly of FIG. 1.

FIG. 6 illustrates in detail a particular mechanical component that may be utilized with the assembly 10. The element 15' illustrated in FIG. 6 is a clamp element having a card engaging portion 27', a hand engaging portion 28', and an axis 29' about which the element 26' is pivotal. The element 26' may be anodized aluminum, with the element 27 rubber, and with the substantially flat top surface 12 with which it cooperates, aluminum or the like. The channel having element 16 may be Delrin or materials having like friction properties to Delrin. Connected to the downwardly extending stationary element 50 associated with the device 15' is the protrusion 51 (which also may be of Delrin or the like) which is shaped and dimensioned so as to fit within—and slide within—the channel 18. A neck portion 52 of the protrusion 51 extends through the chamber 19 into the exterior of the main body portion 11, and is connected to the stationary component 50 by aluminum rivets or the like. A spring (not shown) biases the element 27' downwardly about the axis 29', into engagement with a card 23.

Mounted opposite the protrusion 51, and also attached to the stationary element 50, there may be provided U-shaped structure 54 which is designed to hold writing implements, or other elements. In the embodiment illustrated in the drawings, a plurality of flexible (e.g. rubber or plastic) projections 55 extend toward each other within the generally U-shaped support 56, spaced from each other in such a way that they will grasp and hold a pencil, pen, or like writing implement therewithin. The structure 15' may be readily inserted into, and removed from, the channel 18 merely by sliding it along the upper edge 16 of the body 11.

Figure 7:
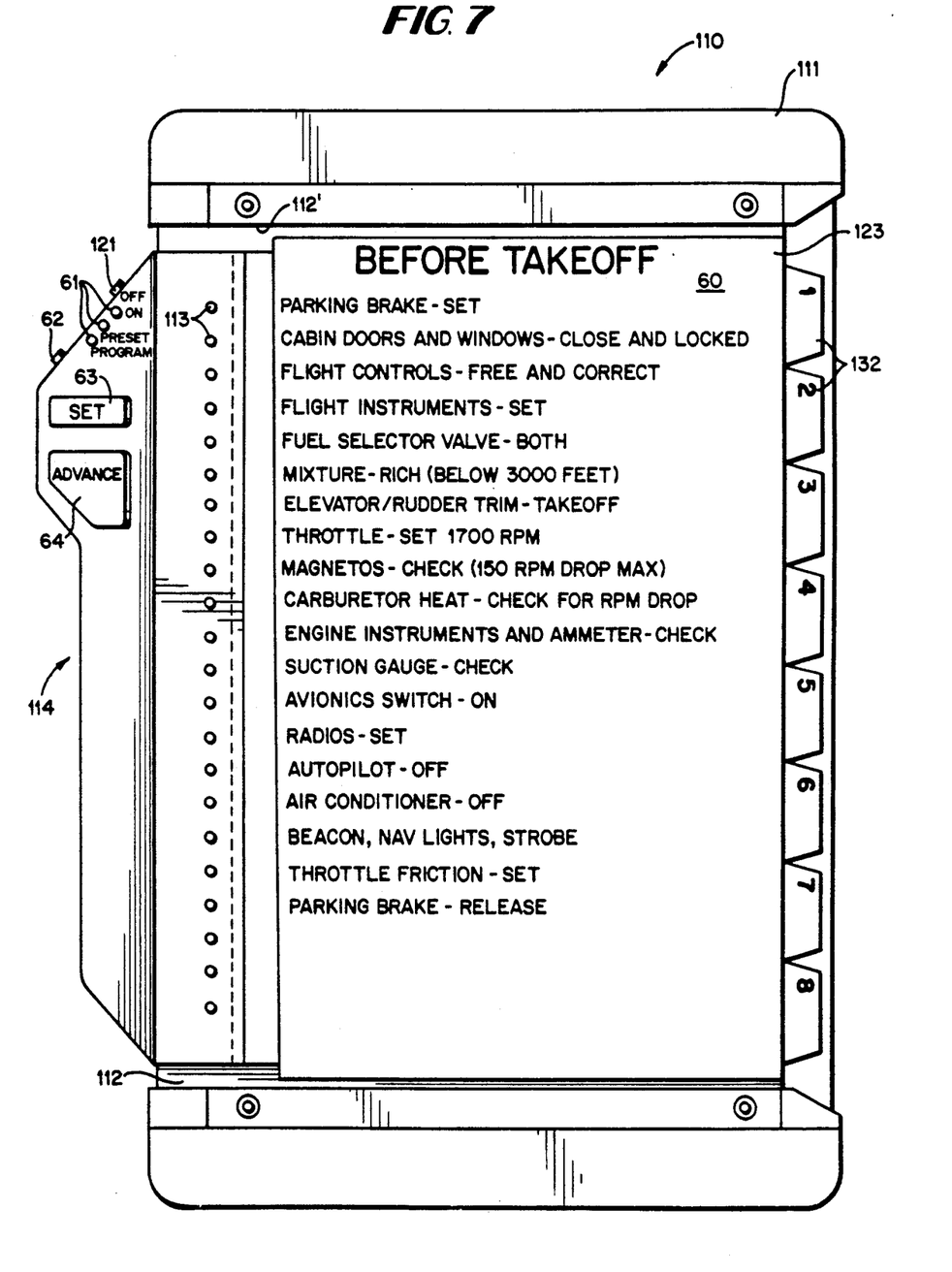
FIG. 7 is a top plan view of a second embodiment of a board assembly according to the invention.

FIG. 7 illustrates a second embodiment of the device according to the invention. Components illustrated in FIG. 7 corresponding to those illustrated in the FIG. 1 embodiment are shown by the same reference numeral only preceded by a "1". In this embodiment, also, the card #1 (that is numbered 1) of all the cards 123, is shown mounted on the top surface 112, and the preflight indicia associated therewith—which is only exemplary—is readable. Each line of indicia, 60, is aligned with an LED 113, mounted in the housing 114. In this embodiment, however, rather than providing a switch associated with each LED 113, a single main switch 121 is provided. That switch has "off", "on", "pre-set", and "program positions", as illustrated by the indicia 61 in FIG. 7. The indicia 61 may take the form of visual indicators, such as LEDs, or may merely be marks on the housing 114.

Also associated with the housing 114 are push button switches 62, 63, and 64. The switch 62 is a "random" switch which randomizes which LED 113 will blink next, while the switch 63 is the "set" switch, and the switch 64 the "advance" switch.

An exemplary logic diagram which shows the potential sequences of operation of the switches 121 and 62 through 64, follows. Of course appropriate circuitry is provided in the housing 114 to allow sequencing of the components in the manner illustrated and described. The details of the circuitry will be apparent to those of ordinary skill in the art, and such details are not—per se—part of this invention

| OFF | ON | PRESET | PROGRAM |
|---|---|---|---|
| | On LED lit<br>light 1 blinking | (must be programmed prior to use)<br>Preset LED lit | Program LED lit<br>all lights blink at once<br>(must choose card #) |
| | ADVANCE<br>light 2 blinking,<br>light 1 on | all lights blinking at once<br>(must choose a card #) | ADVANCE ...to card #, 1 to 22<br>light of card on |
| | ADVANCE<br>light 3 blinking<br>light 2 on | ADVANCE ...to card #, 1 to 22<br>light indicating card, on | SET ...begins program sequence<br>light of card blinks 5 times<br>(check for correct card setting) |
| | light 1 on | SET<br>card # light blinks 5 times<br>(check for proper card setting) | light 1 on |
| | ADVANCE ...till 22,<br>all lights on<br>(end of card)<br>(switch cards) | first light blinks<br>(either #1 or a random #,<br>from first random set) | RANDOM or SET<br>(item 1 must be entered as<br>either sequential or random.<br>RANDOM enters the item number<br>as part of a group of items |
| | ADVANCE or SWITCH MODES or OFF<br>(begining of mode)<br>light 1 blinking | ADVANCE<br>second light blinks<br>(either #2 or a random #,<br>from first random set) | which appear at random when<br>advanced in the PRESET mode.<br>SET enters the item as a<br>specific sequential item when |
| | ADVANCE ...to 22, next card.<br>Change modes or turn off. | first light stays lit | advanced in the PRESET mode.<br>RANDOM must be immediately<br>followed by pushing SET). |
| | ADVANCE or PRESET or OFF | ADVANCE<br>third light blinks | SET<br>light 2 on |
| | | (either #3 or a random #<br>from first random set) | RANDOM or SET<br>SET<br>light 3 on, ...till 22 |
| | | first light stays lit<br>second light stays lit | RANDOM or SET<br>SET |
| | | ADVANCE ...to 22<br>all lights blinking<br>(end of list)<br>(switch cards) | ADVANCE ...ends program sequence<br>all lights on with random items<br>blinking to show card program |
| | | (must choose new card #) | SET ...confirms program |
| | | ADVANCE ...to begin new card<br>or SWITCH MODES or OFF | |

-continued

| OFF — ON | PRESET | PROGRAM |
|---|---|---|
| | | all lights blink at once |
| | Additional Functions Required: | |
| | Battery backup for memory | ADVANCE ...begins card again |
| | | all lights blink at once |
| | Internal rechargeable batteries | (must choose new card number) |
| | 12 V DC power supply jack (from aircraft)* | |
| | Auto shut-off/w audible-blinking warning | ADVANCE or CHANGE MODE or OFF |
| | Self test circuit | CHANGE MODE or OFF prior to |
| | Skip function through Set switch | pushing ADVANCE - SET will |
| | | not enter any of the new list items) |

Figure 8:
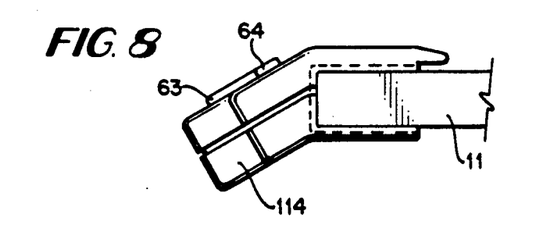
FIG. 8 is a detail end view of the electrical components of the assembly of FIG. 7.
Figure 9:
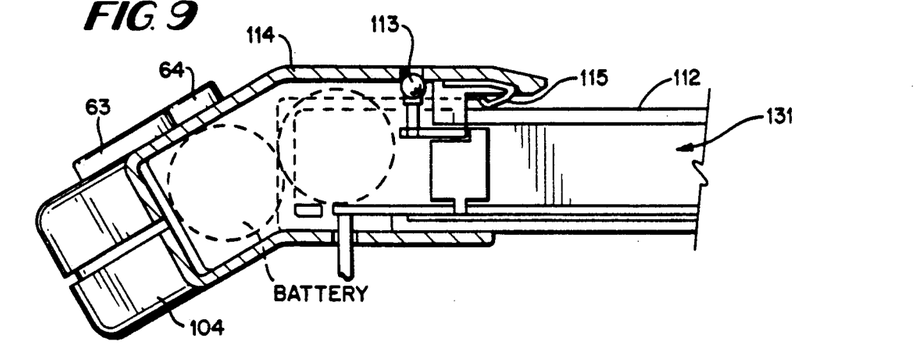
FIG. 9 is a detail cross-sectional view of the components of FIG. 8.

*optional;

In the embodiment illustrated in FIGS. 7 through 9, it will be seen that the holding means 115 comprise bronze spring clips, or the like, which are positioned at a plurality of places (e.g. four) along the length of the housing 114. The spring clips 115 hold the cards between the flat top surface 112 and the housing 114, in proper alignment with the LEDs 113. Also the edges of the cards engage steps 112' (e.g. see step 12' in FIG. 6) along the surface 112, which assist in properly positioning the cards.

Figure 10:
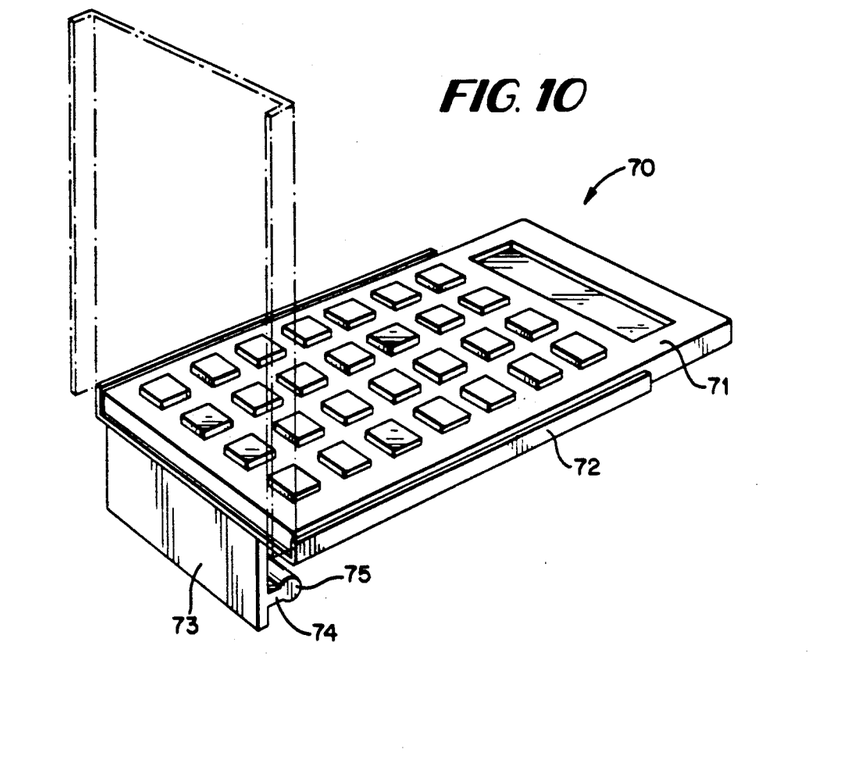
FIG. 10 is a perspective view of an exemplary electronic component which may be utilized with the assemblies of FIGS. 1 or 7.

FIG. 10 illustrates an exemplary electronic component which may be utilized with the board assemblies 10, 110. It will be described with respect to the device 10. The electronic component 70 comprises a calculator 71 which is mounted in a channel-shaped element 72 pivotally mounted about an axis (not shown) to a stationary leg 73. The leg 73 has a neck 74 extending outwardly therefrom and ending in a protrusion 75. The protrusion 75 and neck 74 are shaped and dimensioned so as to be slideable within, and fit within, the channel 18 and opening 19. By pivoting the holder 72 about a horizontal axis, parallel to the surface 12, the calculator may be moved between storage and use positions, or the like. When the calculator 71 is not required, of course the whole structure 70 is slid out of the channel 18, detached therefrom. A wide variety of other electrical or mechanical components may also be utilized, such as electric lights, clocks, thermometers, etc.

Figure 11:
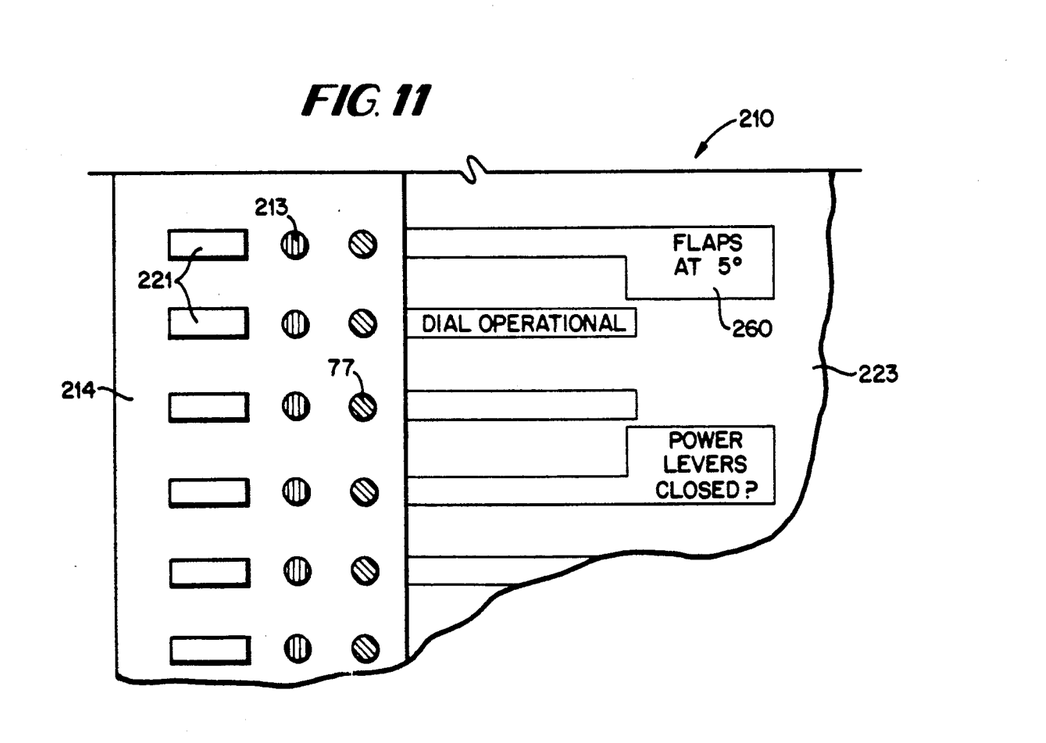
FIG. 11 is a top plan detail view of a portion of a third embodiment of the board assembly according to the invention.

FIG. 11 shows yet another embodiment of an assembly according to the present invention. In this embodiment components comparable to those in the FIG. 1 embodiment are shown by the same reference numeral only preceded by a "2".

The main distinguishing feature of the embodiment 210 is the utilization of two sets of visual indicators (e.g. LEDs), 213 and 77. The lights 213 preferably are red and indicate that the check-off procedure has not been performed, whereas the lights 77 are green and indicate that the indicia line 260 associated therewith, procedure, has been performed. The switches 221 switch the LEDs. That is when a switch 221 is in a first position its associated red light 213 is activated, and in a second position the green light 77 is activated. If desired a third switch position may also be provided, in which position neither light is actuated.

It will thus be seen that according to the present invention a pre-flight or in-flight checklist, or the like, facilitating device has been provided which has failsafe operations in that it clearly indicates which pre-flight procedures have already been performed, and which have not. However it is not an expensive computer, or like electronic component, but rather only includes a few electronic parts, and should be simple and easy to manufacture in many different facilities. Thus the assembly according to the present invention combines the failsafe features of sophisticated prior art computer checklist devices, with the simplicity and inexpensiveness of conventional knee boards or flight desks.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A board assembly comprising:
    a main body having a substantially flat top surface;
    a plurality of visual indicator means comprising light emitting diodes;
    at least one indicator card having indicia thereon;
    means for mounting said visual indicator means in operative association with said main body top surface so that when an indicator card is placed thereon areas of the indicator card line up with said visual indicator means; and
    holding means for holding an indicator card on said top surface in alignment with said visual indicator means.

2. An assembly as recited in claim 1 further comprising a plurality of indicator cards, each card dimensioned to fit on said top surface and having indicia thereon positioned in operative association with at least a few of said visual indicator means.

3. An assembly as recited in claim 2 further comprising means defining a storage compartment in said main body below said top surface, said compartment dimensioned to fit a plurality of said cards therein.

4. An assembly as recited in claim 3 wherein each of said cards has a tab thereon.

5. An assembly as recited in claim 3 wherein said indicia comprises a pre-flight or in-flight checklist for a vehicle capable of becoming airborne.

6. An assembly as recited in claim 3 further comprising latch means for holding said cards in place within said storage compartment.

7. An assembly as recited in claim 1 further comprising means for mounting said main body on a human's leg.

8. An assembly as recited in claim 7 wherein said mounting means comprise grooved foam pads.

9. An assembly as recited in claim 1 further comprising means defining at least one channel in an edge portion of said main body, for receiving mechanical and/or electrical accessories with protrusions shaped and dimensioned like said channel.

10. An assembly as recited in claim 1 further comprising a switch associated with each light emitting diode for activating or deactivating the light emitting diode with which it is associated.

11. An assembly as recited in claim 1 further comprising a second light emitting diode associated with each light emitting diode, said second light emitting diode having a different property than the first light emitting diode.

12. A board assembly for pilot pre-flight or in-flight procedures, comprising:
    a main body having a substantially flat top surface;
    a plurality of indicator cards, each card dimensioned to fit on said top surface, and having a pre-flight or in-flight procedure indicia thereon;
    holding means for holding an indicator card on said top surface in alignment with said top surface; and
    means defining a storage compartment in said main body below said top surface, said compartment dimensioned to fit a plurality of said cards therein; and
    wherein each of said cards has a tab thereon, dimensioned to extend out of said compartment, and wherein latch means are provided to releasably hold the cards within said storage compartment.

13. A board assembly comprising:
    a main body having a substantially flat top surface;
    holding means for holding an indicator card on said top surface in alignment with said top surface;

said indicator card having a pre-flight or in-flight procedure indicia thereon; and means defining a channel along at least one edge of said main body, for receipt of mechanical and/or electrical accessories with protrusions shaped like said channel; and wherein said holding means comprises a clamp with a protrusion extending therefrom shaped and dimensioned to be received within said channel for sliding movement with respect thereto.

14. A board assembly comprising:

a main body having a substantially flat top surface;

a plurality of visual indicator means comprising light emitting diodes;

at least one indicator card having indicia thereon;

means for mounting said visual indicator means in operative association with said main body top surface so that when an indicator card is placed thereon areas of the indicator card line up with said visual indicator means;

holding means for holding an indicator card on said top surface in alignment with said visual indicator means; and mounting means comprising grooved foam pads for mounting said main body on a human's leg.

15. A board assembly comprising:

a main body having a substantially flat top surface;

a plurality of visual indicator means comprising light emitting diodes;

at least one indicator card having indicia thereon;

means for mounting said visual indicator means in operative association with said main body top surface so that when an indicator card is placed thereon areas of the indicator card line up with said visual indicator means;

holding means for holding an indicator card on said top surface in alignment with said visual indicator means; and means defining at least one channel in an edge portion of said main body, for receiving mechanical and/or electrical accessories with protrusions shaped and dimensioned like said channel.

16. An assembly as recited in claim 15 further comprising an electrical accessory for mounting in said channel, with a protrusion shaped and dimensioned like said channel.

17. An assembly as recited in claim 15 wherein said holding means comprises a clip, said clip comprising a mechanical accessory with a protrusion shaped and dimensioned to correspond to said channel.

18. An assembly as recited in claim 17 further comprising implement holding means operatively associated with said clip, and mounted therewith for relative movement with respect to said channel.

* * * * *